June 14, 1960 M. A. PETROSSI 2,940,562
SECTIONAL CLUTCH SHAFT
Filed May 6, 1957
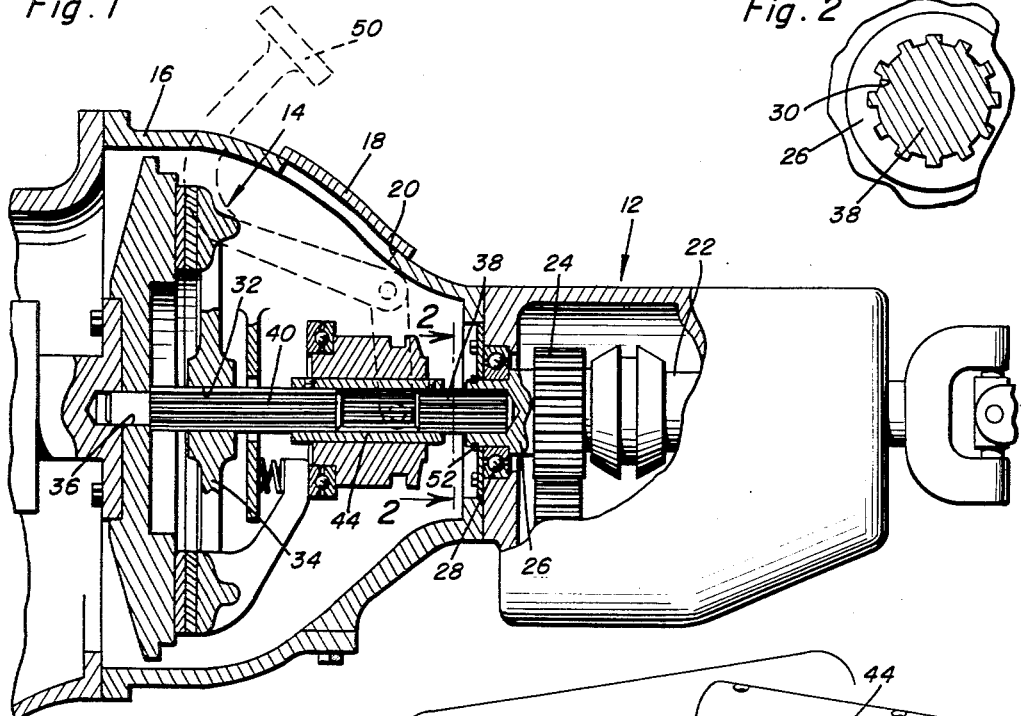
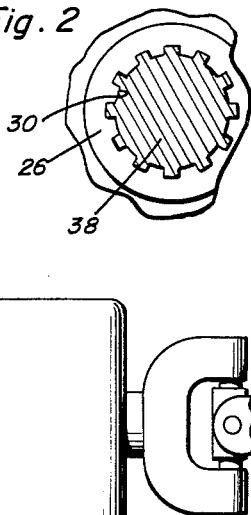
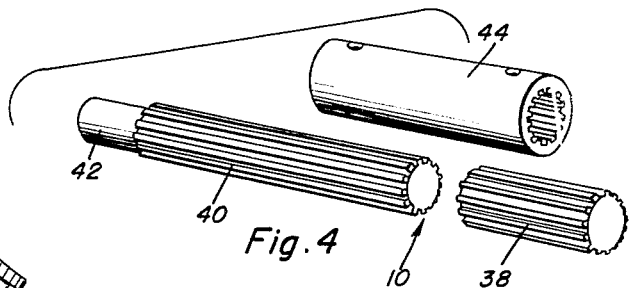
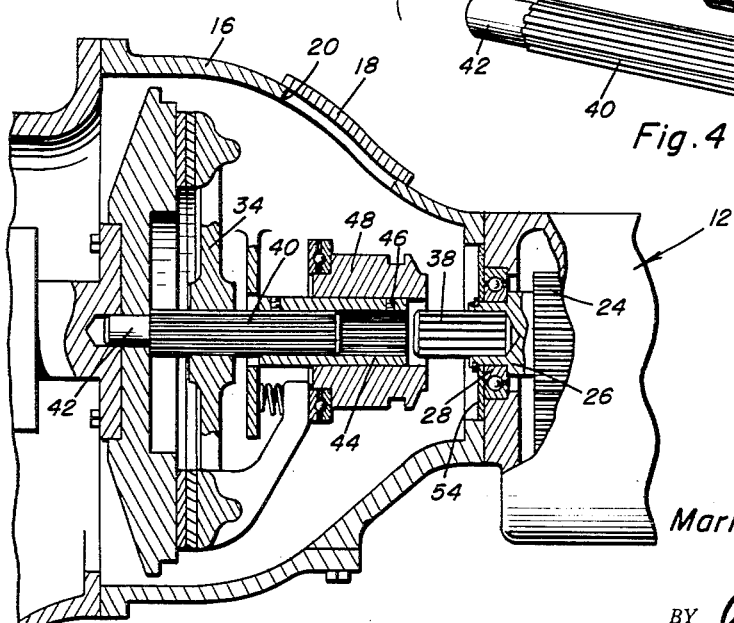
Mario A. Petrossi
INVENTOR.

United States Patent Office 2,940,562
Patented June 14, 1960

2,940,562
SECTIONAL CLUTCH SHAFT
Mario A. Petrossi, Rochester, N.Y., assignor to Irma T. Petrossi, Rochester, N.Y.
Filed May 6, 1957, Ser. No. 657,410
2 Claims. (Cl. 192—3.5)

The present invention generally relates to a novel structural arrangement in a clutch shaft for interconnecting the clutch and the transmission of a motor vehicle which is constructed so that the clutch may be readily disassembled and replaced without removing or otherwise disturbing the transmission or the engine thus requiring a minimum of time and effort for such work.

In certain types of vehicles such as trucks, it quite often occurs that the clutch assembly needs replacement or repair due to extended periods of use or hard wear. In trucking certain materials, it is absolutely imperative that the payload be expedited at all times. A good example of this necessity is the hauling of concrete from a mixing plant to a point of delivery. If the clutch fails on such a delivery, the time necessary for repair and replacement thereof would cause the mixed cement to harden or else require the unloading thereof. Accordingly, it is the primary object of the present invention to reduce the "down" time of a truck or similar vehicle in repairing or replacing the elements of the clutch assembly.

Another object of the present invention is to provide the usual transmission shaft which is normally rigid with and projecting from the transmission with a plurality of sections with the end sections being detachably and drivingly engaged with the main shaft of the transmission and the clutch pressure plate.

Other objects of the present invention will reside in its simplicity of construction, ease of installation, labor and money saving qualities as well as its time saving construction.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a sectional view of the clutch and transmission assembly illustrating the clutch shaft of the present invention installed therein;

Figure 2 is a detailed sectional view taken generally upon a plane pass along section line 2—2 of Figure 1 showing the internal spline on the main shaft of the transmission;

Figure 3 is a sectional view similar to Figure 1 illustrating the manner in which the sectional shaft is disassembled; and Figure 4 is an exploded group perspective view of the sectional clutch shaft of the present invention.

Referring now specifically to the drawings, the numeral 10 generally designates the sectional clutch shaft of the present invention for use with a transmission generally designated by the numeral 12 and a clutch assembly designated by the numeral 14 having a housing 16 enclosing the same and the housing 16 may have an enlarged inspection plate and opening 18 and 20 so that the clutch assembly 14 may be adjusted and also for permitting removal and replacement of portions of the clutch assembly.

The transmission 12 includes the usual main shaft 22 with the main drive gear 24 on the forward end thereof with the main drive gear 24 having a stub shaft 26 journaled in a bearing 28 in the front wall of the transmission 12 with the bearing, end of the stub shaft 26 and the front wall of the transmission being substantially coplanar. The stub shaft 26 is provided with an intnernally splined socket 30 which is in alignment with the splined opening 32 of the pressure plate 34 of the clutch assembly and which also is in alignment with a pilot bearing 36 in the clutch facing plate.

The shaft 10 includes a relatively short externally splined section 38 and a relatively long externally splined section 40 having a reduced cylindrical end 42 journaled in the pilot bearing 35. The sections 38 and 40 are in spaced longitudinal alignment and are interconnected by an internally splined sleeve 44 with setscrews 46 extending therethrough for rigid engagement with the sections 38 and 40. The exterior surface of the sleeve 44 is smooth for providing a bearing surface for the throw out bearing element 48 which is actuated by the usual clutch pedal 50. The sectional shaft 10 replaces the usual one-piece rigid clutch or transmission shaft and permits disassembly of this shaft by removing or loosening the setscrews 46 for permitting the pressure plate or friction disc of the clutch assembly to be replaced without removal of the transmission 12. The sleeve 44 also forms a bearing for the usual throw out 48 and it is pointed out that the invention may be used with any conventional clutch and transmission.

The stub shaft 26 is provided with the usual split lock key 52 for retaining the transmission splined gear in position. Also, a flat cover plate 54 is provided in the front of the transmission for retaining the bearing 28 in position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a power transmission system, the combination of a speed change transmission, a clutch selectively connected with a power source, and a clutch shaft detachably interconnecting the clutch and the transmission, said shaft being sectional and including a pair of longitudinally spaced and aligned sections, each of said sections being exteriorly splined, an internally splined sleeve interconnecting adjacent ends of the sections, means releasably securing the sleeve to each of said sections for forming a rigid shaft for transmitting power from the clutch to the transmission, the exterior of said sleeve being smooth for slidable journaling a throw-out bearing for the clutch, the distance between the adjacent ends of the splined sections being sufficient to permit the outer ends of the sections to be moved inwardly thereby reducing the length of the shaft for disengagement from the clutch and transmission to permit replacement of the clutch without disturbing the power source and the transmission.

2. The combination of claim 1 wherein one of said sections has the end thereof remote from the sleeve splined to the clutch pressure plate and provided with a reduced cylindrical projection rotatably journaled in a pilot bearing, the other of said sections having the end thereof remote from the sleeve removably splined in an internally splined blind socket in the end of the main drive shaft of the transmission.

References Cited in the file of this patent

UNITED STATES PATENTS

| | | |
|---|---|---|
| 256,728 | Palmer | Apr. 18, 1882 |
| 957,602 | Duryea et al. | May 10, 1910 |
| 1,126,448 | Gruenewald | Jan. 26, 1915 |
| 1,821,127 | Vandeveer | Sept. 1, 1931 |
| 2,319,496 | Fishburn | May 18, 1943 |